US012151268B2

(12) United States Patent
Small et al.

(10) Patent No.: US 12,151,268 B2
(45) Date of Patent: Nov. 26, 2024

(54) METHODS AND SYSTEMS FOR DEVICE MAINTENANCE

(71) Applicant: McKesson Corporation, Irving, TX (US)

(72) Inventors: Cody Small, Loveland, CO (US); Brendan Thomas Hunt, Boulder, CO (US)

(73) Assignee: McKesson Corporation, Irving, TX (US)

( * ) Notice: Subject to any disclaimer, the term of this patent is extended or adjusted under 35 U.S.C. 154(b) by 105 days.

(21) Appl. No.: 17/943,648

(22) Filed: Sep. 13, 2022

(65) Prior Publication Data

US 2024/0082890 A1 Mar. 14, 2024

(51) Int. Cl.

*B65D 83/04* (2006.01)
*B08B 9/032* (2006.01)
*H05F 3/00* (2006.01)

(52) U.S. Cl.

CPC ............ *B08B 9/0325* (2013.01); *B65D 83/04* (2013.01); *H05F 3/00* (2013.01); *B08B 2209/032* (2013.01); *B65D 2583/04* (2013.01)

(58) Field of Classification Search

CPC . A47L 13/40; A61J 7/02; A61J 7/0076; G07F 17/0092; H05F 3/00; H05F 3/06; B65D 90/46

USPC .................................................. 361/212, 220

See application file for complete search history.

(56) References Cited

U.S. PATENT DOCUMENTS 3,928,753 A * 12/1975 Kivett .................. G06M 1/101 377/6

8,833,602 B1 * 9/2014 Balasubramanian ........................ G07F 11/005 221/277

2009/0158537 A1 * 6/2009 Ishijima ................ B08B 15/023 15/1.51

2017/0008716 A1 * 1/2017 Dahlqvist ................ B65H 7/02

* cited by examiner

*Primary Examiner* — Danny Nguyen

(74) *Attorney, Agent, or Firm* — Ballard Spahr LLP

(57) ABSTRACT

Methods and systems for device maintenance are described herein. Objects, such as pills, tablets, capsules, etc., may build an electrostatic charge as they pass through a dispensing device. This electrostatic charge may cause the objects to adhere to components of the dispensing device, such as inside a tube, chamber, etc. To prevent this from happening, the dispensing device may comprise an ionizing component, such as a fan, that may be configured to perform a maintenance procedure. The maintenance procedure may allow the objects to pass through various components of the dispensing device more freely.

20 Claims, 19 Drawing Sheets

100

METHODS AND SYSTEMS FOR DEVICE MAINTENANCE

BACKGROUND

Objects, such as pills, tablets, capsules, etc., may build an electrostatic charge as they pass through a dispensing device (s) and/or system(s). This electrostatic charge may cause such objects to adhere to components of the dispensing device(s) and/or system(s), such as inside a tube, chamber, etc. As a result, the dispensing device(s) and/or system(s) may inaccurately count and/or dispense the objects. These and other considerations are addressed by the present description.

SUMMARY

It is to be understood that both the following general description and the following detailed description are exemplary and explanatory only and are not restrictive. Methods and systems for device maintenance are described herein. Objects, such as pills, tablets, capsules, etc., may build an electrostatic charge as they pass through a dispensing device. This electrostatic charge may cause the objects to adhere to components of the dispensing device, such as inside a tube, chamber, etc. To prevent this from happening, the dispensing device may comprise an ionizing component, such as a fan, that may be configured to perform a maintenance procedure. The maintenance procedure may comprise the ionizing component circulating ionized air throughout the interior of the dispensing device. The ionized air may neutralize the electrostatic charge of the objects within the dispensing device, thereby allowing the objects to pass through various components of the dispensing device more freely.

The dispensing device may comprise a control module in communication with the ionizing component and one or more components of the dispensing device. The control module may cause the ionizing component to operate to perform the maintenance procedure (e.g., to circulate the ionized air throughout the interior of the dispensing device) at various times and/or in response to various triggers. For example, the control module may cause the ionizing component to perform the maintenance procedure at any time an object(s) is present within the dispensing device. As another example, the control module may cause the ionizing component to perform the maintenance procedure according to a schedule. As a further example, the control module may cause the ionizing component to perform the maintenance procedure when the control module determines that an expected dispensing rate and/or dispensing quantity has not been achieved within a particular duration/interval.

Other examples are possible as well, as further described herein. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the methods and systems described herein.

DETAILED DESCRIPTION

Figure 1:
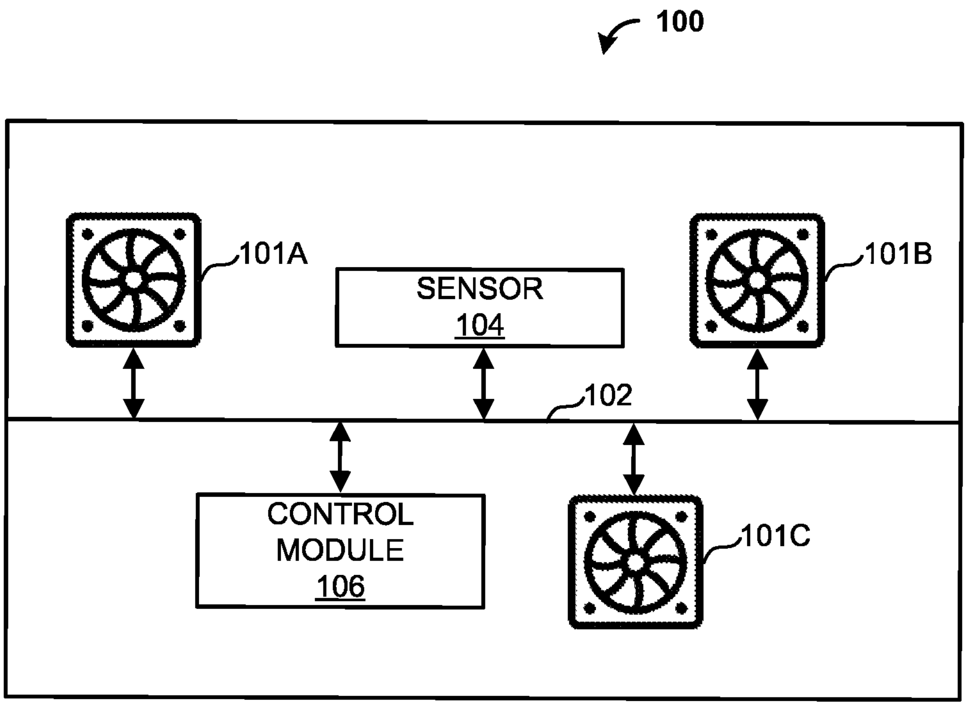
FIG. 1 shows an example device.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memristors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions. This detailed description may refer to a given entity performing some action. It should be understood that this language may in some cases mean that a system (e.g., a computer) owned and/or controlled by the given entity is actually performing the action.

FIG. 1 shows an example dispensing device 100. Objects, such as pills, tablets, capsules, etc., may build an electrostatic charge as they pass through (e.g., within) the dispensing device 100. This electrostatic charge may cause the objects to adhere to components of the dispensing device 100, such as inside a tube, chamber, etc. These components may be tapped or otherwise moved mechanically in order to dislodge objects that are stuck (e.g., as a result of the electrostatic charge). However, mechanical means may not be sufficient to dislodge objects having a relatively strong electrostatic charge. To prevent objects from adhering to components of the dispensing device 100, the dispensing device 100 may comprise one or more ionizing components 101A, 101B, 101C, such as ionizing fans, ionizing blowers, and/or the like. While the dispensing device 100 is shown in FIG. 1 as comprising three ionizing components 101A, 101B, and 101C, for ease of explanation the description herein will refer to a single ionizing component 101. However, it is to be understood that the dispensing device may comprise more than one ionizing component 101—each of which may be configured to operate in a similar manner.

The ionizing component 101 may be located at any area on or within the dispensing device 100. For example, the ionizing component 101 may be located on a front, back, side, top, bottom, and/or within the dispensing device 100, as further described herein. The ionizing component 101 may be configured to perform a maintenance procedure to discharge any objects within the dispensing device 100 that may have built up an electrostatic charge as a result of moving within, along, adjacent, etc., components of the dispensing device 100 (e.g., tube(s), hopper(s), feeder(s), plate(s), bowl(s), etc.). The maintenance procedure may comprise the ionizing component 101 circulating ionized air throughout the interior of the dispensing device 100. The ionized air may neutralize the electrostatic charge of the objects within the dispensing device 100, thereby allowing the objects to pass through, over, within, etc., the various components of the dispensing device 100 more freely.

The dispensing device 100 may comprise a control module 106 in communication with the ionizing component 101 and one or more components of the dispensing device 100, such as a sensor(s) 104. The control module 106 may cause the ionizing component 101 to operate to perform the maintenance procedure (e.g., to circulate the ionized air throughout the interior of the dispensing device 100) at various times and/or in response to various triggers.

The control module 106 may cause the ionizing component 101 to perform the maintenance procedure at any time an object(s) is present within the dispensing device 100. For example, the sensor 104 may comprise a weight sensor, optical sensor, etc., that may indicate to the control module 106 when an object(s) is present within the dispensing device 100. When the sensor 104 provides such an indication, the control module 106 may cause the ionizing component 101 to operate and circulate ionized air throughout the interior of the dispensing device 100 to prevent the object(s) from building up (and/or to neutralize) an electrostatic charge.

The control module 106 may cause the ionizing component 101 to perform the maintenance procedure according to a schedule. For example, the control module 106 may cause the ionizing component 101 to operate at various times throughout a day, such as one or more intervals of time. The schedule may be configured and/or adjusted as needed or preferred. The control module 106 may cause the ionizing component 101 to operate according to the schedule (e.g., the one or more intervals of time) for varying durations of time (e.g., the duration of time may not be the same for each interval of time).

The control module 106 may cause the ionizing component 101 to perform the maintenance procedure when the control module 106 determines that an expected dispensing rate and/or dispensing quantity has not been achieved within a particular duration/interval. For example, the control module 106 may cause the ionizing component 101 to perform the maintenance procedure in response to an indication received from the sensor 104. The sensor 104 may indicate to the control module 106 a count/quantity of objects (e.g., pills, tablets, capsules, etc.) that pass through a particular component(s) of the dispensing device 100, such as a count tube, hopper, bowl, etc., adjacent to the sensor 104. The dispensing device 100 may comprise a sensor 104 at or near each such component.

The control module 106 may determine that the count of objects indicated by the sensor 104 falls below an expected quantity (e.g., threshold quantity) within a set interval/ period of time. For example, the sensor 104 may be located at a dispensing neck or a dispensing chute of the dispensing device 100, and the sensor 104 may indicate to the control module 106 that X objects have passed through the dispensing neck or the dispensing chute during a quantity of time Y. If the value, X, is less than the expected quantity (e.g., threshold quantity) for the quantity of time Y, then the control module 106 may cause the ionizing component 101 to perform the maintenance procedure. As another example, the control module 106 may cause the ionizing component 101 to perform the maintenance procedure once the threshold quantity has been met or exceeded within a specified/configurable quantity of time. As a further example, the control module 106 may cause the ionizing component 101 to perform the maintenance procedure each instance that the threshold quantity is met or exceeded (e.g., each time that 1,000 objects are dispensed, etc.).

Additionally, or in the alternative, the control module 106 may cause the ionizing component 101 to perform the maintenance procedure based on a type of object dispensed. For example, capsules (e.g., capsule-style pills) may generate greater electrostatic charge when being dispensed as compared to tablet and/or molded pills. The control module 106 may be configured to adjust the schedule and/or thresholds described herein (or to use a specific schedule and/or threshold quantity) based on the type of object dispensed.

In some examples, the sensor 104 may comprise a temperature sensor, a pressure sensor, a humidity sensor, a combination thereof, and/or the like. The control module 106 may cause the ionizing component 101 to perform the maintenance procedure when the control module 106 determines (e.g., based on feedback, a signal, etc., from the sensor 104) that a particular ambient condition(s) is present. The particular ambient condition(s) may comprise, as an example, a particular temperature, pressure, humidity, etc., within and/or adjacent to the dispensing device 100 and/or any component(s) thereof.

The control module 106 may cause the ionizing component 101 to perform the maintenance procedure for a specified/configurable duration of time. The specified/configurable duration of time may be a same duration of time regardless of the particular trigger that causes the maintenance procedure to be performed (e.g., regardless of the type of threshold/trigger). As another example, the specified/configurable duration of time may be based on the particular trigger that causes the maintenance procedure to be performed. Further, the specified/configurable duration of time may be based on the type of object dispensed, the particular ambient condition(s), a combination thereof, and/or the like.

Figure 2A:
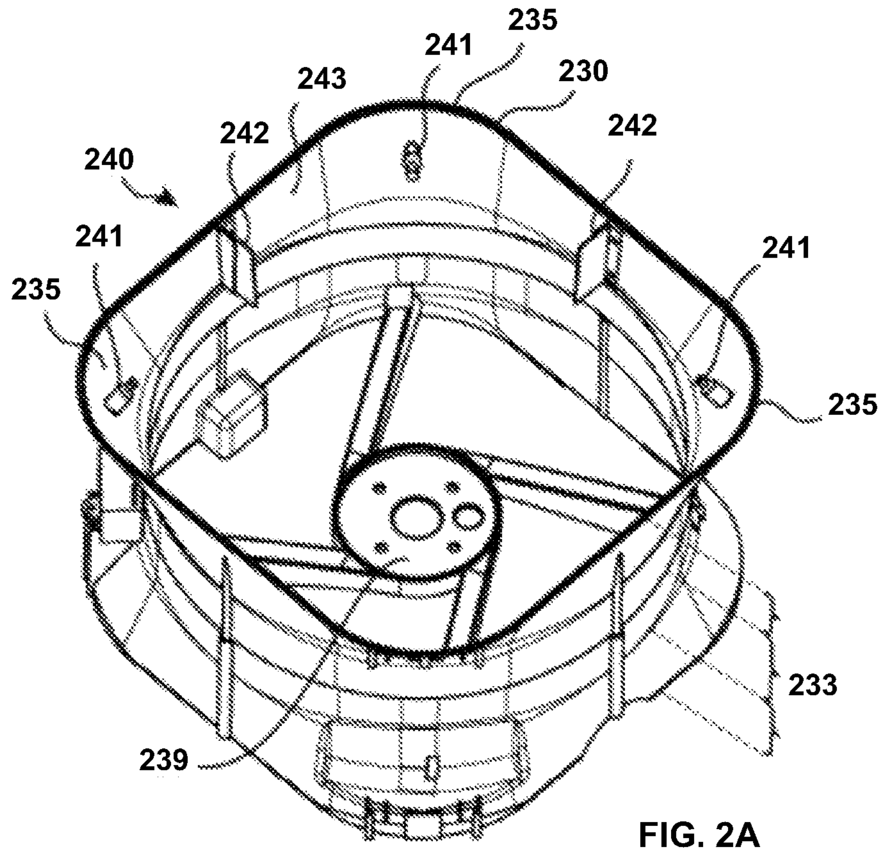
FIG. 2A shows a first view of an example device component.
Figure 2B:
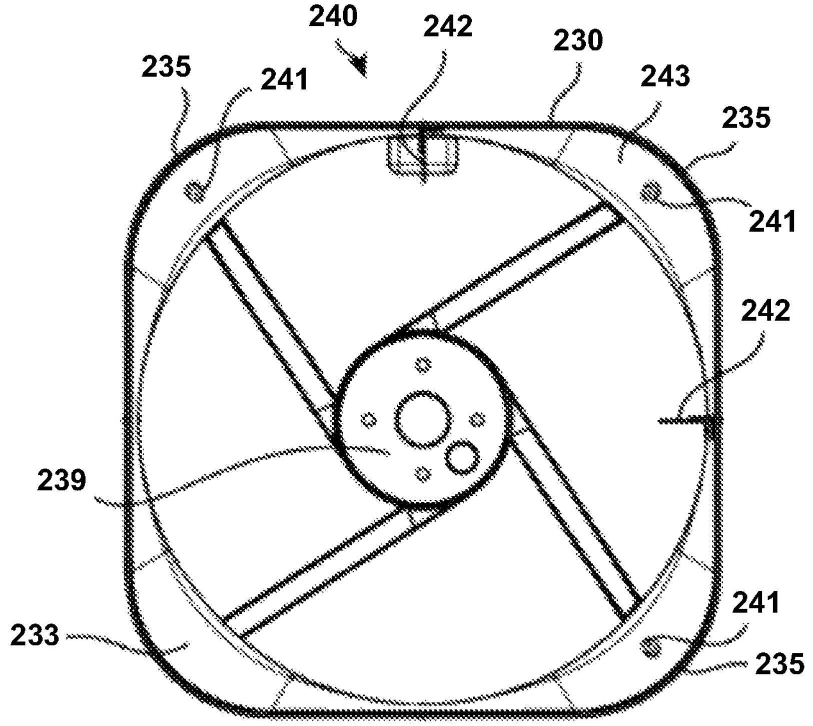
FIG. 2B shows a second view of an example device component

Turning now to FIGS. 2A and 2B, example views of an ionizing component 240 are shown. Each of the ionizing components 101A, 101B, and 101C shown in FIG. 1 may comprise the ionizing component 240. Additionally, or in the alternative, each of the ionizing components 101A, 101B, and 101C shown in FIG. 1 may comprise another ionizing component other than the ionizing component 240 shown in FIGS. 2A and 2B. The ionizing component 240 shown in FIGS. 2A and 2B is meant to be exemplary only. Any suitable ionizing component(s) may be used, as one skilled in the art may appreciate.

As shown in FIGS. 2A and 2B, the ionizing component 240 may comprise a fan duct 230 in which a fan (e.g., an ionizing fan, anti-static fan, etc.) may be situated. The fan duct 230 may be located on a front, back, side, or top of the dispensing device 100. FIG. 2A shows an example perspective view of the ionizing component 240 and the fan duct 230, while FIG. 2B shows an example top view of the ionizing component 240 and the fan duct 230. The fan duct 230 may comprise a support structure 239 arranged to support the fan in the fan duct 230. The ionizing component 240 may comprise one or more electrodes 241 coupled to an electricity source (not shown) and one or more collector plate electrodes 242 coupled to a ground and arranged in a chamber (e.g., an ionizing chamber). The electrodes 241 may comprise brush electrodes, pin electrodes, etc., and the collector plate electrodes 242 may comprise, for example, sheet metal attached to a side wall 243 of the fan duct 230. The chamber may be formed by an upper end portion 233 of the fan duct 230. The collector plate electrodes 242 may extend from the side wall 243 inwards toward the chamber, such as towards a middle of the chamber, and along a main direction of air flow within the dispensing device 100.

When an electric potential (e.g., electrical current) is applied to the electrodes 241, an electromagnetic (EM) field may be formed generally between the electrodes 241 and the collector plate electrodes 242. The control module 106 may be configured to cause the electric potential to be applied to the electrodes 241 (e.g., as part of causing the maintenance procedure described herein to be performed). When molecules and/or airborne particles pass through the EM field in the chamber, they may be ionized. For example, the dispensing device 100 may be configured to apply an electric potential to the electrodes 241, which may result in mostly negative ions (e.g., anions) being created. The resulting ionized air may be circulated throughout the dispensing device 100 in order to discharge/neutralize an electrostatic charge of one or more objects that may be present within various components of the dispensing device 100.

FIGS. 3-11 show example views of the dispensing device 100 and one or more of the ionizing components described herein (e.g., the ionizing component 240). It is to be understood that the dispensing device 100 may be designed differently than the examples shown in FIGS. 3-11. The examples shown in FIGS. 3-11 are meant for explanatory purposes only and are merely exemplary.

Figure 3:
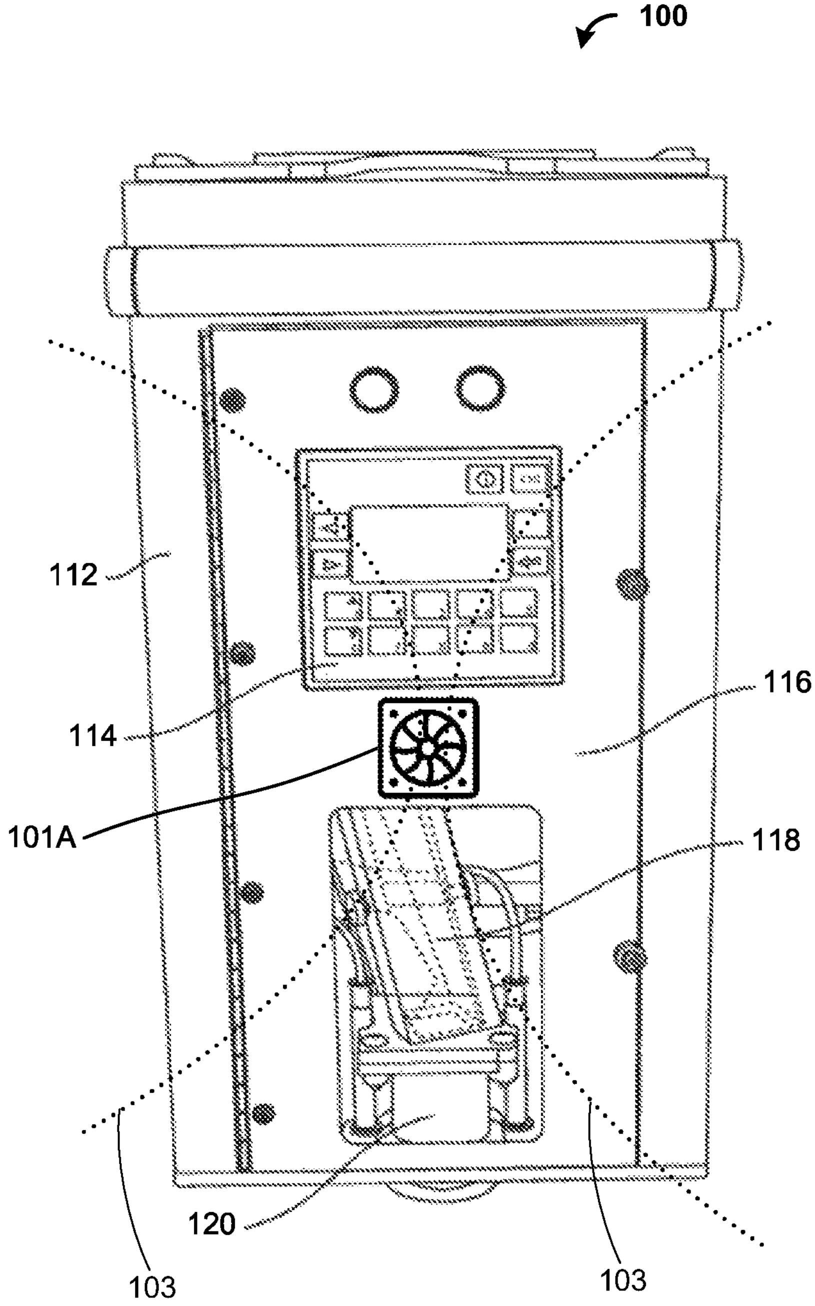
FIG. 3 shows a front view of an example device.

FIG. 3 shows an example front view of the dispensing device 100 with the ionizing component 101A situated thereon. It is to be understood that the ionizing component 101A may be situated at another location(s) of the dispensing device 100. The depiction of the dispensing device 100 with the ionizing component 101A as shown in FIG. 3 is meant to be exemplary only. The ionizing component 101A may circulate ionized air throughout the interior of the dispensing device 100, which is shown in FIG. 3 as airflow 103. In some examples, the ionizing component 101A may draw outside air into the dispensing device 100 and/or circulate ionized air (e.g., inside and/or outside air—once ionized by the ionizing component 101A) throughout the interior of the dispensing device 100.

The dispensing device 100 may generally comprise, for example, a housing, a storage compartment, a feeding assembly, a dispensing route, a plurality of optical sensors (e.g., sensor 104), and a controller (e.g., control module 106). The housing may comprise a frame 112 that surrounds a front door panel 116. The front door panel 116 may comprise a window portion through which a dispensing chute 118 and a dispensing neck 120 can be viewed. The dispensing chute 118 and the dispensing neck 120 may comprise the dispensing route of the dispensing device 100. A controller interface panel 114 of the dispensing device 100 may be coupled to the controller to provide a user interface for the dispensing device 100. The controller interface panel 114 may comprise a display screen, an entry keypad, and other display and data entry components. The dispensing device 100 may be mounted and secured to a support surface. Accordingly, the dispensing neck 120 may move downwardly and upwardly (e.g., extend and retract) to facilitate interconnection with, for example, a pill bottle into which objects (e.g., pills, tablets, capsules, etc.) passing through the dispensing device 100 may be dispensed. The ionized air circulated by the ionizing component 101A (e.g., the airflow 103) may assist the objects traveling within, on, or through the dispensing chute 118 and/or the dispensing neck 120 by neutralizing any electrostatic charge that may have developed as the objects are dispensed (e.g., travel within) the dispensing device 100.

Figure 4:
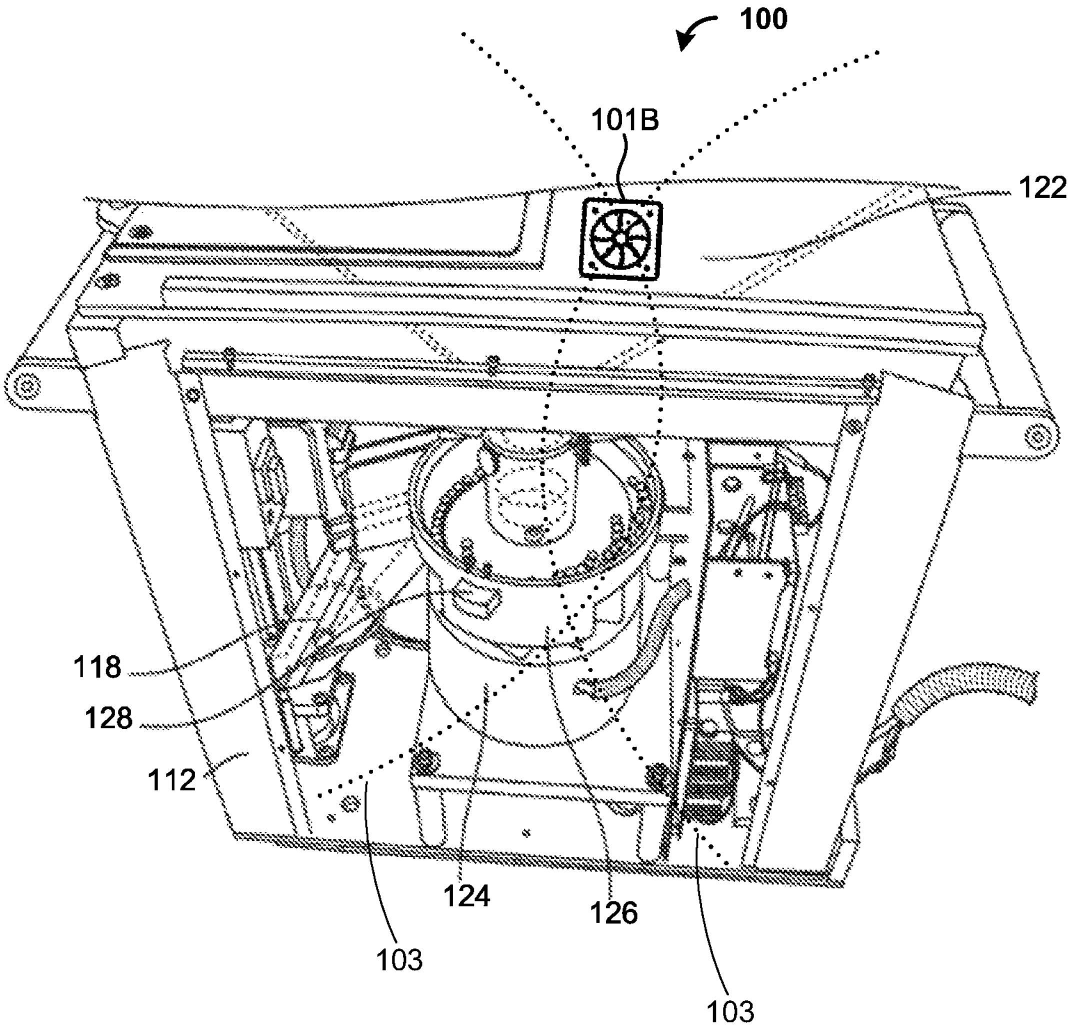
FIG. 4 shows a side view of an example device.

FIG. 4 shows an example top view of the dispensing device 100 (from the right side with a panel removed from the frame 112) with the ionizing component 101B situated thereon. It is to be understood that the ionizing component 101B may be situated at another location(s) of the dispensing device 100. The depiction of the dispensing device 100 with the ionizing component 101B as shown in FIG. 4 is meant to be exemplary only. The ionizing component 101B may circulate ionized air throughout the interior of the dispensing device 100, which is shown in FIG. 4 as airflow 103. At the top of FIG. 4, a portion of a hopper 122 can be seen. The hopper 122 may be utilized as a temporary storage compartment for the dispensing device 100. For example, objects (e.g., pills, tablets, capsules, etc.) may be temporarily stored in the hopper 122. The hopper 122 may comprise a releasing mechanism adapted to control the flow of objects therein. The releasing mechanism may be controlled by the control module 106 or another device or system in communication with the dispensing device 100.

As shown in FIG. 4, the hopper 122 may connect to a vibratory feeder bowl 126. The vibratory feeder bowl 126 may be coupled to a vibratory base unit 124. The vibratory feeder bowl 126 and the vibratory base unit 124 may comprise a feeding assembly of the dispensing device 100. In operation, objects may ascend up a spiraling edge of the vibratory feeder bowl 126 to an exit edge by vibratory force. The exit edge may represent an exit position from the feeding assembly to a dispensing route of the dispensing device 100. The exit position is typically a point where the objects may free fall after leaving a feeding mechanism. For example, objects may fall from the exit edge of the vibratory feeder bowl 126 into the dispensing route (a portion of which, the dispensing chute 118 can be seen in FIG. 4) and eventually into, for example, a pill bottle. The dispensing device 100 may also comprise a singulator 128. The singulator 128 may be coupled to the vibratory feeder bowl 126 prior to the exit edge. The singulator 128 may act to ensure that objects passing thereby are moving in single file. The ionized air circulated by the ionizing component 101B (e.g., the airflow 103) may assist the objects traveling within, on, or through the singulator 128, the vibratory base unit 124, and/or the vibratory feeder bowl 126 by neutralizing any electrostatic charge that may have developed as the objects are dispensed (e.g., travel within) the dispensing device 100.

Figure 5:
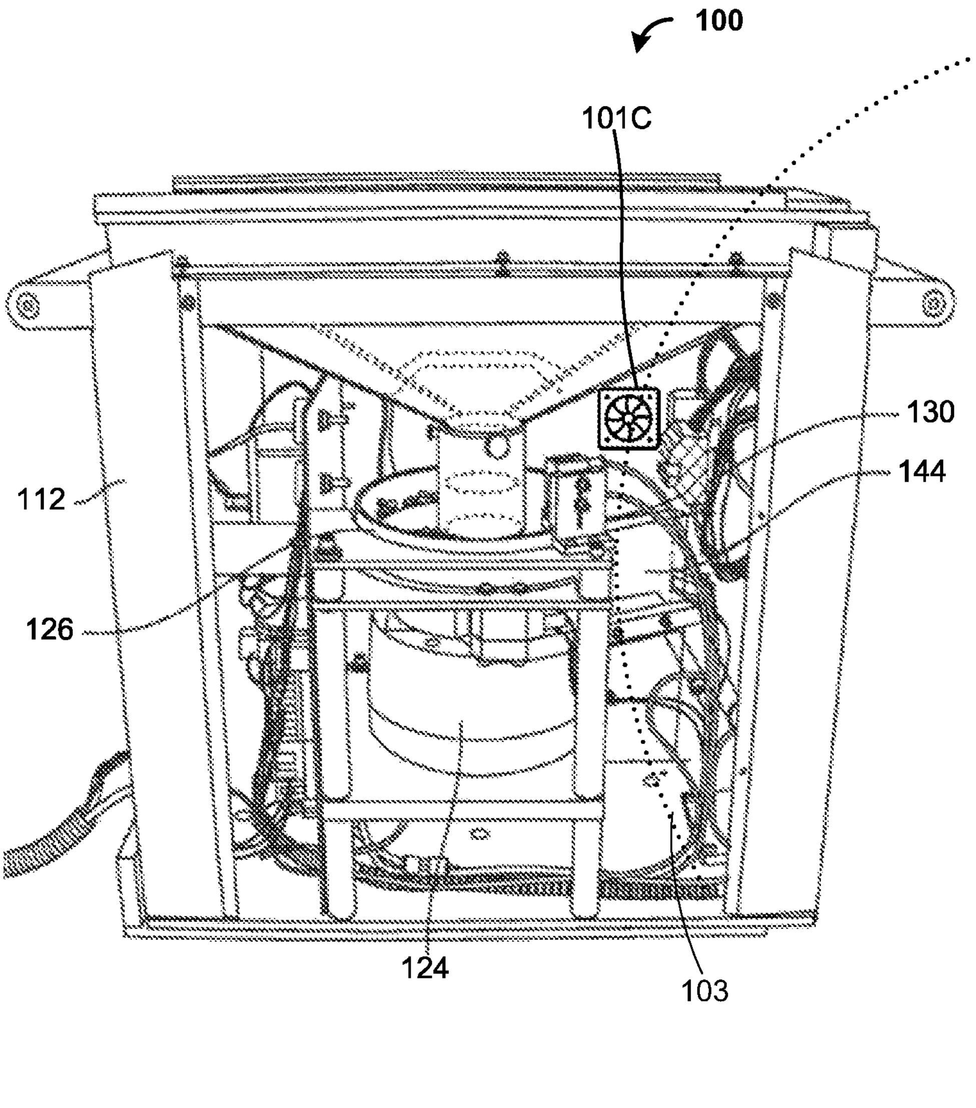
FIG. 5 shows a side view of an example device.

FIG. 5 shows an example side view of the dispensing device 100 (from the left side with a panel removed from the frame 112) with the ionizing component 101C situated thereon. It is to be understood that the ionizing component 101C may be situated at another location(s) of the dispensing device 100. The depiction of the dispensing device 100 with the ionizing component 101C as shown in FIG. 5 is meant to be exemplary only. The ionizing component 101C may circulate ionized air throughout the interior of the dispensing device 100, which is shown in FIG. 5 as airflow 103. The feeding assembly of the dispensing device 100 described herein may further include a stopping mechanism coupled to the vibratory feeder bowl 126 proximate to the exit position. The stopping mechanism may comprise a pneumatic stopping mechanism 130. The pneumatic stopping mechanism 130 may comprise a shoe (not shown) that extends downwardly against objects located proximate to the exit edge of the vibratory feeder bowl 126. When activated, the pneumatic stopping mechanism 130 acts to prevent the objects from inadvertently falling over the exit edge, such as when a desired count/quantity of the objects have been dispensed.

FIG. 5 also shows an upper portion 144 of the dispensing route of the dispensing device 100. The upper portion 144 may be proximate to the pneumatic stopping mechanism 130 and the exit edge of the vibratory feeder bowl 126. The upper portion 144 may be a first portion of the dispensing route of the dispensing device 100 into which the objects may enter upon leaving the exit position of the feeding assembly of the dispensing device 100 described herein. The ionized air circulated by the ionizing component 101C (e.g., the airflow 103) may assist the objects traveling within, on, or through the upper portion 144 by neutralizing any electrostatic charge that may have developed as the objects are dispensed (e.g., travel within) the dispensing device 100.

Figure 6:
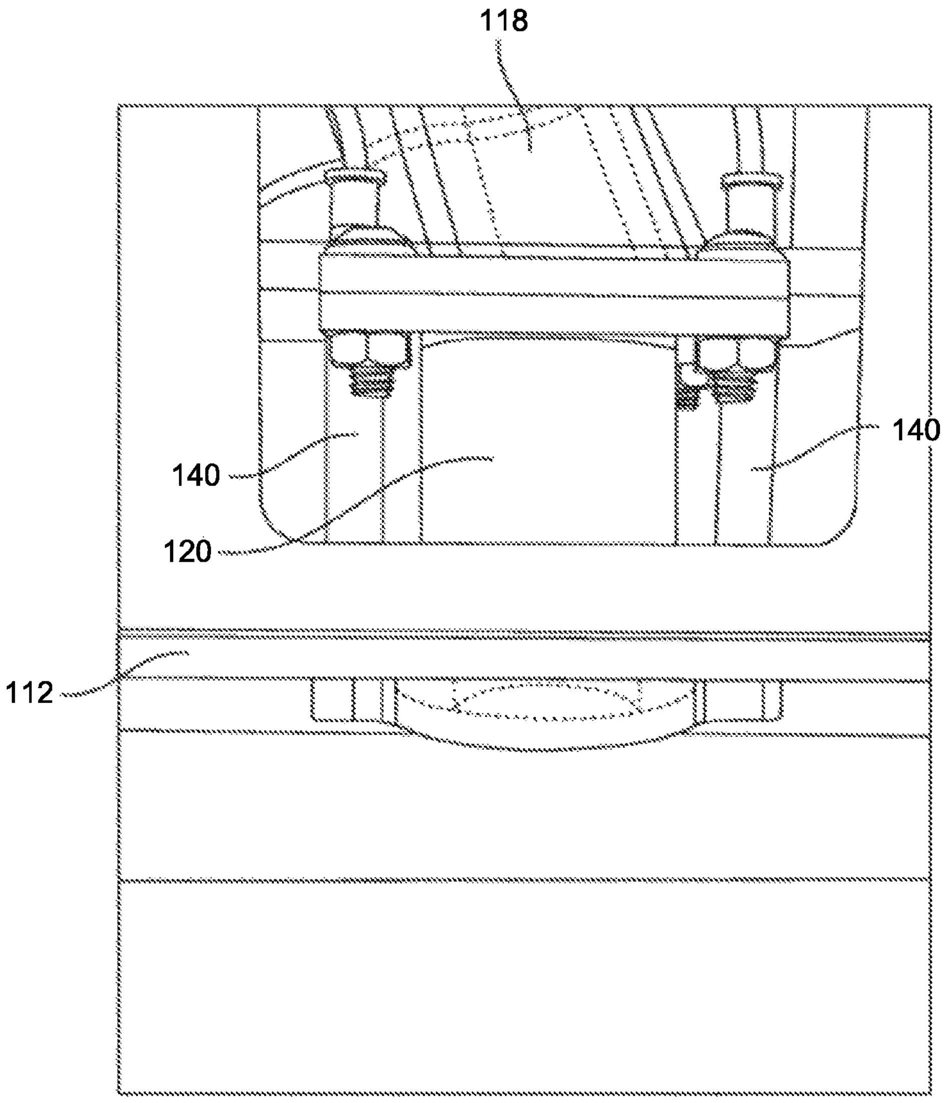
FIG. 6 shows a close-up view of a portion of an example device.

FIG. 6 shows an example close-up front perspective view of the dispensing neck 120 of the dispensing device 100. The dispensing route of dispensing device 100 may vary significantly in embodiments, configurations, etc. The dispensing route may generally be a line or path of travel for the objects as they leave or drop from the exit position of the feeding assembly. An end portion of the dispensing route of the dispensing device 100 may comprise the dispensing neck 120. The dispensing neck 120 may be coupled to a lower portion of the dispensing chute 118 and moveably coupled proximate to a bottom end of the frame 112. As shown in FIG. 6, the dispensing neck 120 is in a retracted position. The dispensing neck 120 may be in the retracted position when the dispensing device 100 is not actively dispensing objects. One or more pneumatic actuators 140 may be coupled to the dispensing neck 120 to facilitate the movement of objects within/through the dispensing neck 120.

Figure 7:
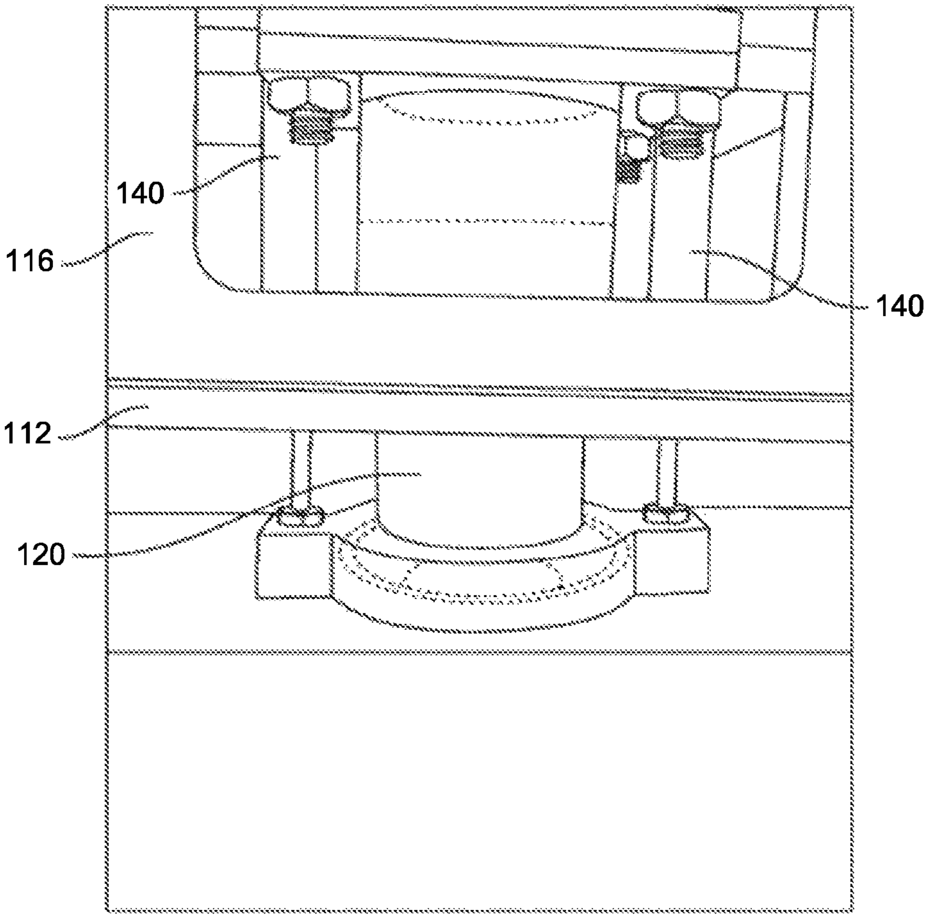
FIG. 7 shows a close-up view of a portion of an example device.

FIG. 7 shows the dispensing neck 120 in an extended position. As shown in FIG. 7, a first portion of the dispensing neck 120 can be seen through the front door panel 116 and a second portion can be seen downwardly extended beyond the bottom end of the frame 112. The extended position can be achieved upon activation of the two pneumatic actuators 140. For example, the dispensing neck 120 may be in the extended position when the dispensing device 100 is actively dispensing objects.

Figure 8:
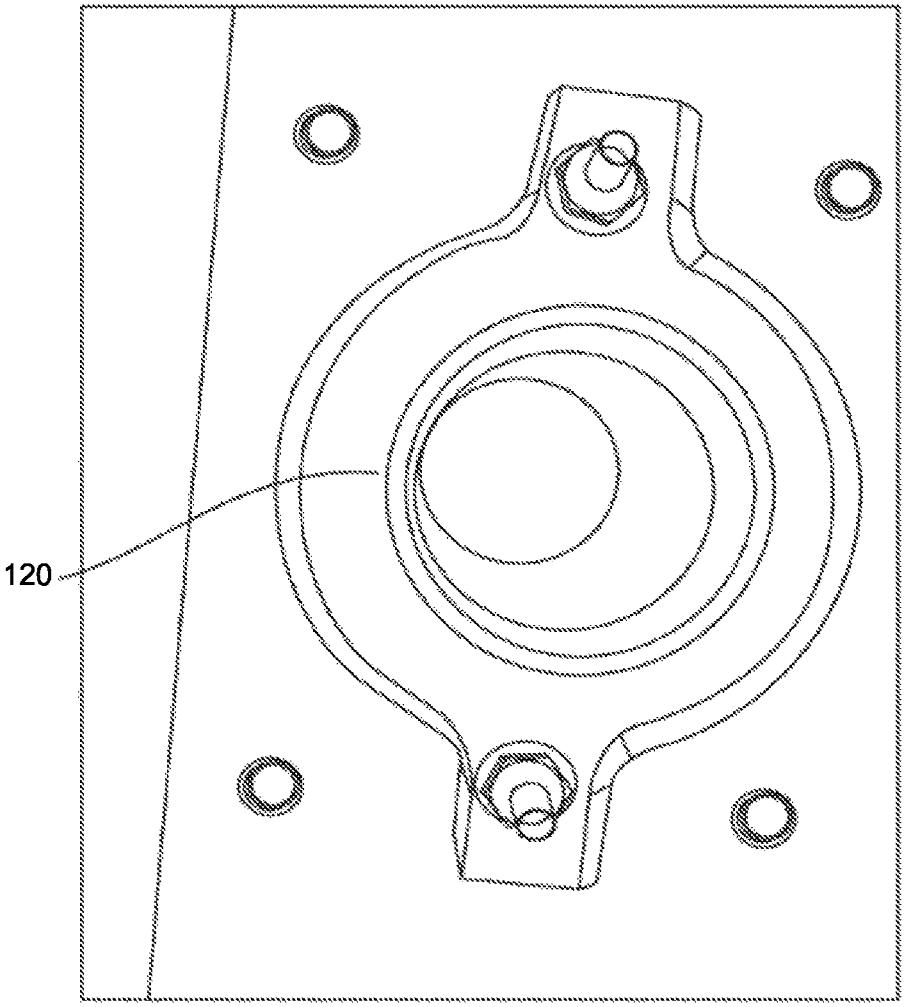
FIG. 8 shows a close-up view of a portion of an example device.
Figure 9:
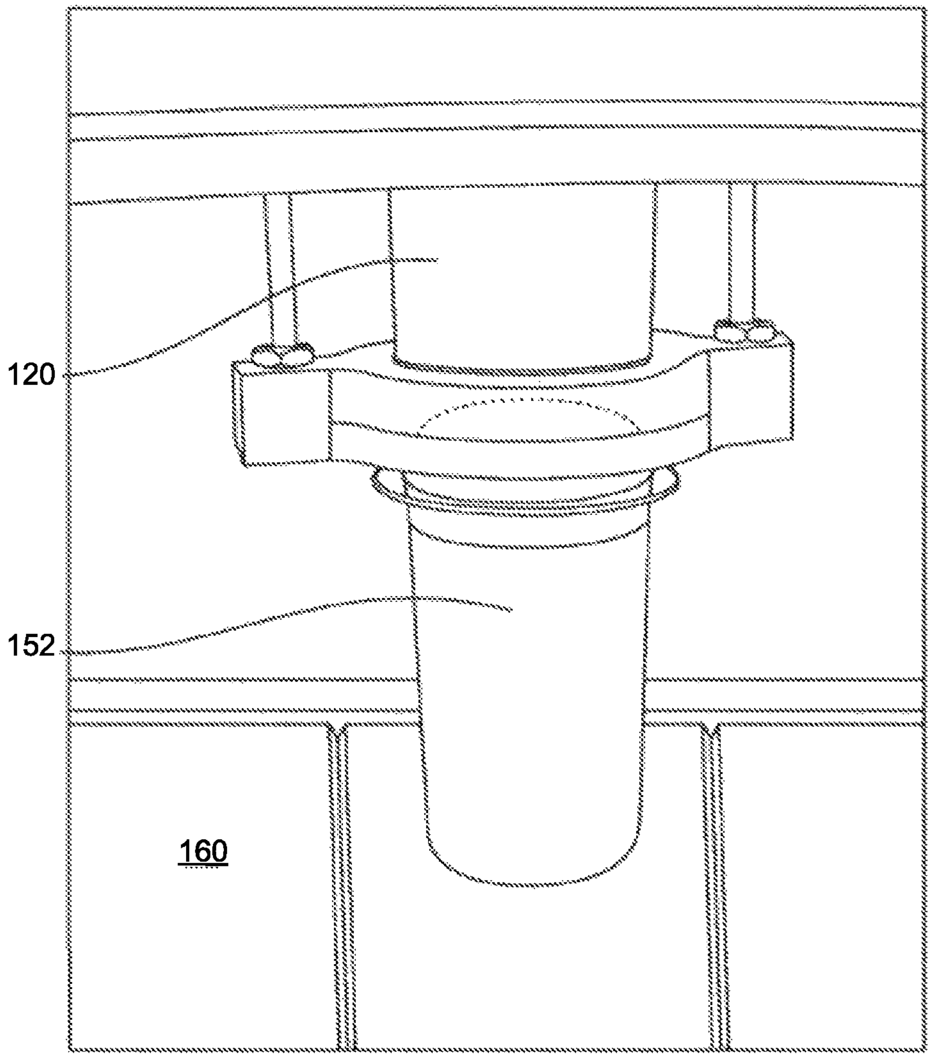
FIG. 9 shows a close-up view of a portion of an example device.

FIG. 8 shows a close-up bottom perspective view of the dispensing neck 120. As illustrated, the dispensing neck 120 may comprise a circumferential channel extending around a neck opening. The circumferential channel may be adapted to fit around a capturing mechanism/storage mechanism for the objects dispensed by the dispensing device 100, such a pill bottle 152 shown in FIG. 9, which shows a close-up front perspective view of the pill bottle 152 engaged with the dispensing neck 120. The dispensing neck 120 as shown in FIG. 9 may be in an extended configuration while engaged with the pill bottle 152. The pill bottle 152 may be on a conveyor belt 160 (or other means of conveyance) to route the pill bottle 152 to the dispensing device 100. The dispensing neck 120 may be extended and retracted by the control module of the dispensing device 100 (e.g., the control module 106). The ionized air circulated by one or more of the ionizing components described herein (e.g., the airflow 103) may assist the objects traveling within, on, or through the dispensing neck 120 into the pill bottle 152 by neutralizing any electrostatic charge that may have developed as the objects are dispensed (e.g., travel within) the dispensing device 100.

Figure 10:
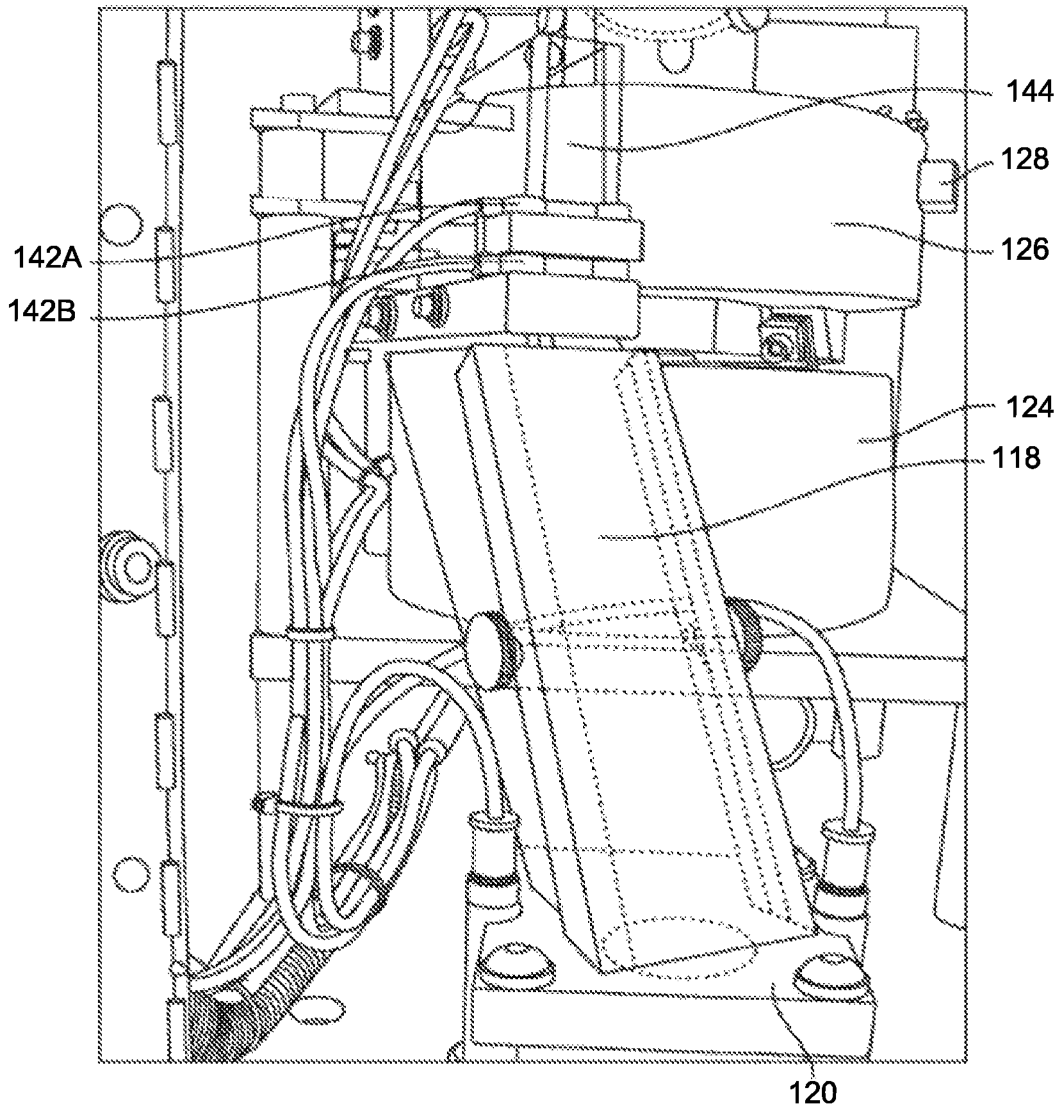
FIG. 10 shows a close-up view of a portion of an example device.

FIG. 10 shows a close-up front perspective view of the dispensing chute 118 and its coupling to the dispensing neck 120. The dispensing chute 118 can be seen relative to the vibratory base 124 and the vibratory feeder bowl 126. The dispensing route of dispensing device 100 may comprise the upper portion 144, which may be proximate and operatively coupled to the exit position of the feeding assembly of the dispensing device 100. The upper portion 144 may comprise optical sensor heads 142A and 142B (e.g., sensor(s) 104), each of which may be adjacent the upper portion 144. The ionized air circulated by one or more of the ionizing components described herein (e.g., the airflow 103) may assist the objects traveling within, on, or through the upper portion 144 by neutralizing any electrostatic charge that may have developed as the objects are dispensed (e.g., travel within) the dispensing device 100.

Figure 11:
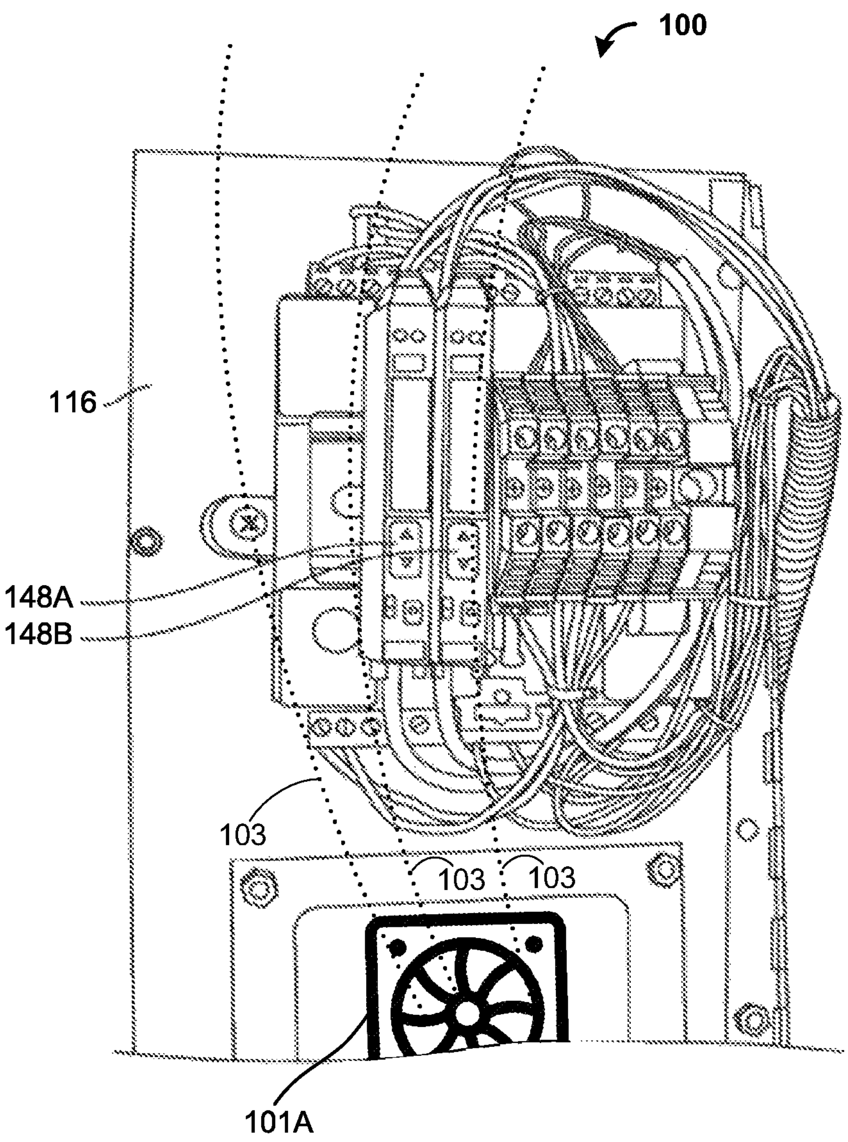
FIG. 11 shows an interior view of a portion of an example device.
Figure 13:
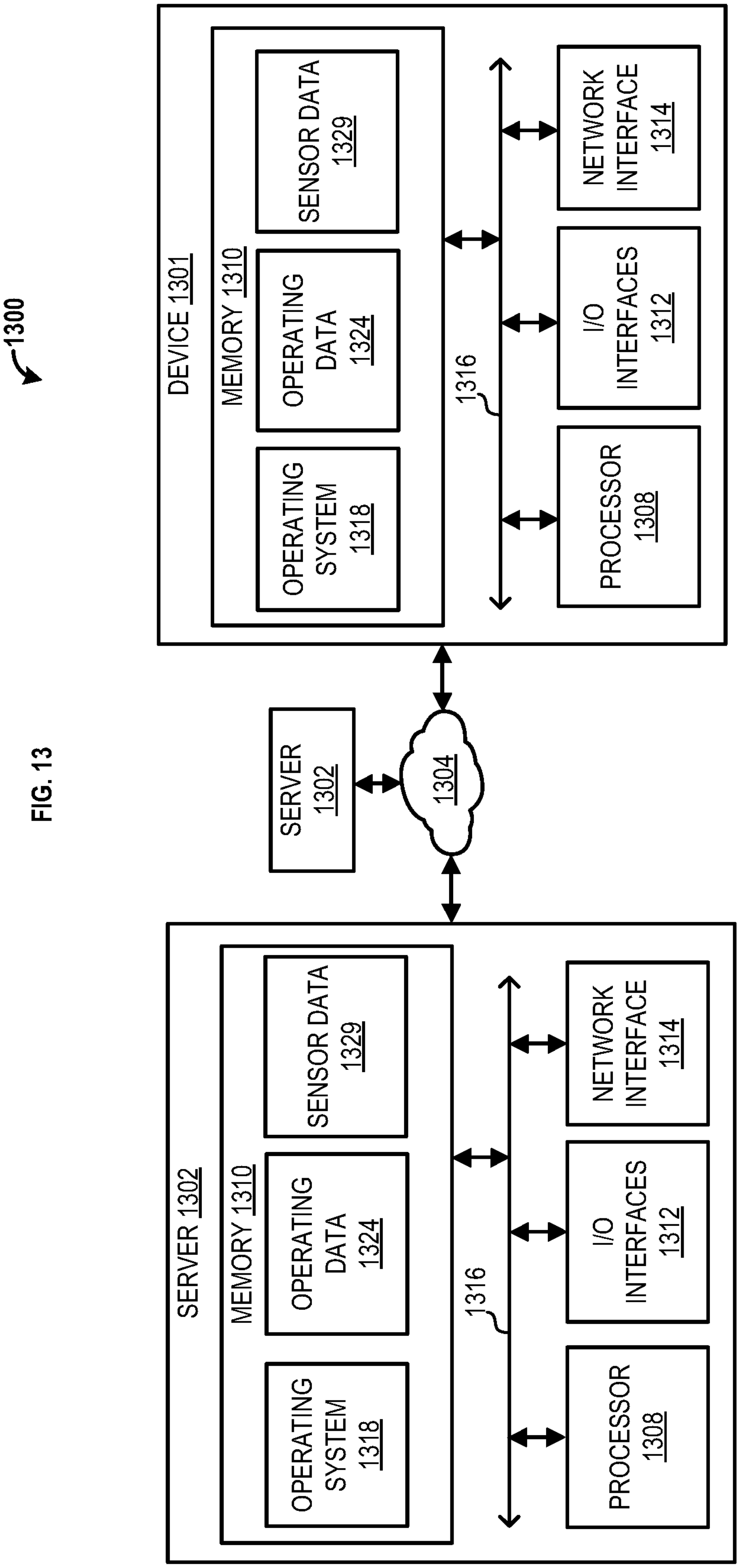
FIG. 13 shows a block diagram of an example system.

FIG. 11 shows the control module of the dispensing device 100 (e.g., the control module 106) with the ionizing component 101A situated thereon. The control module of the dispensing device 100 may be mounted to an inside surface of the front door panel 116. The control module of the dispensing device 100 may comprise a programmable logic controller, a computing device(s), etc. For example, the control module of the dispensing device 100 may comprise a computing device 1301 as shown in FIG. 13 and described herein. The control module of the dispensing device 100 (e.g., the control module 106) may be operatively coupled to (e.g., in communication with) various elements and components of the dispensing device 100. For example, the control module of the dispensing device 100 may be in communication with the optical sensors 142A and 142B (e.g., sensor (s) 104).

The optical sensors 142A and 142B (e.g., sensor(s) 104) may be controlled by the control module of the dispensing device 100. Each of the optical sensors 142A and 142B may comprise a light emitting component and a light detecting component. The light emitting component may comprise, a laser diode, a light emitting diode, and/or any other light/electromagnetic wave projecting component. The control module of the dispensing device 100 may comprise a first optical sensor controller 148A and a second optical sensor controller 148B. The first optical sensor controller 148A may be operatively coupled to the optical sensor 142A, and the second optical sensor controller 148B may be operatively coupled to the optical sensor 142B.

A light beam may be created between the optical sensor 142A and the optical sensor 142B. The light beam may facilitate counting a quantity of the objects and/or a dispensing rate of the objects as they pass through the dispensing device 100 and out to the pill bottle 152 (e.g., via the dispensing chute 118 and/or the dispensing neck 120). For example, when an object moves between the optical sensor 142A and the optical sensor 142B (e.g., falls past each sensor), a disruption to the light beam may be indicated by the optical sensor 142A and the optical sensor 142B, which may be recorded by the control module of the dispensing device 100 as a "count" (e.g., one count per object). In some configurations of the dispensing device 100, the control module of the dispensing device 100 may send count information to a computing device, such as the server 1202 shown in FIG. 12 and described herein. The computing device may monitor and/or control a plurality of dispensing device 100.

The control module of the dispensing device 100 may cause one or more of the ionizing components described herein to perform a maintenance procedure as described herein (e.g., to circulate ionized air via the air flow 103) at any time an object(s) is present within the dispensing device 100. For example, the optical sensor 142A and/or the optical sensor 142B may indicate to the control module of the dispensing device 100 (e.g., the control module 106) when an object(s) is present within the dispensing device 100. When the optical sensor 142A and/or the optical sensor 142B provides such an indication, the control module may cause one or more of the ionizing components described herein to operate and circulate ionized air throughout the interior of the dispensing device 100 to prevent the object(s) from building up (and/or to neutralize) an electrostatic charge.

As described herein, the control module may cause one or more of the ionizing components described herein to perform the maintenance procedure according to a schedule. As another example, the control module may cause one or more of the ionizing components described herein to perform the maintenance procedure when the control module determines that an expected dispensing rate and/or dispensing quantity has not been achieved within a particular duration/interval. Other examples and configurations are possible as well.

FIGS. 12A-12F show several views of an example dispensing device 1200. The dispensing device 1200 may be configured to operate in a similar manner as the dispensing device 100. It is to be understood that the dispensing device 100 and the dispensing device 1200 are examples of dispensing devices. Any dispensing device suitable for dispensing objects as described herein may be used as well. The particular examples shown in the Figures (e.g., the dispensing device 100 and the dispensing device 1200) are not meant to be limiting but are rather merely exemplary devices intended for illustrative purposes only.

Figure 12A:
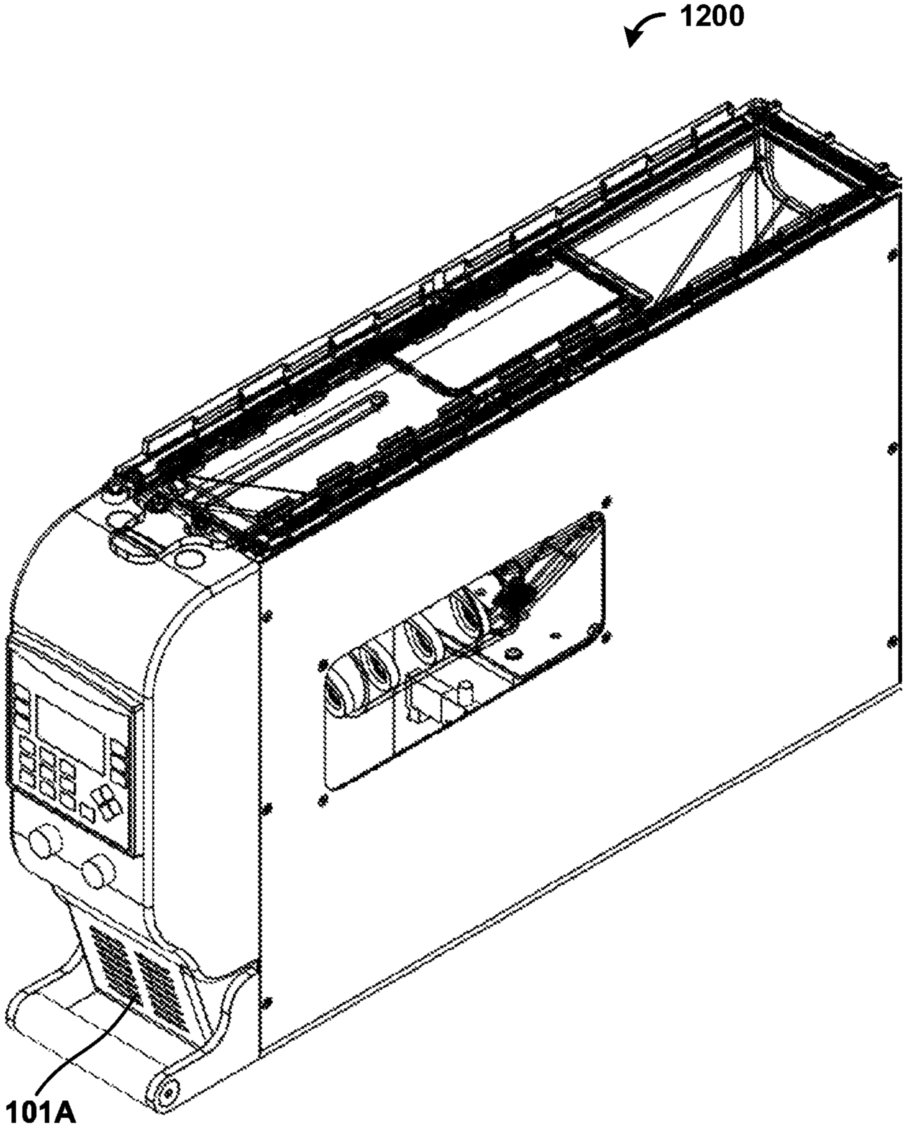
FIGS. 12A-12F show portions of an example device.
Figure 12B:
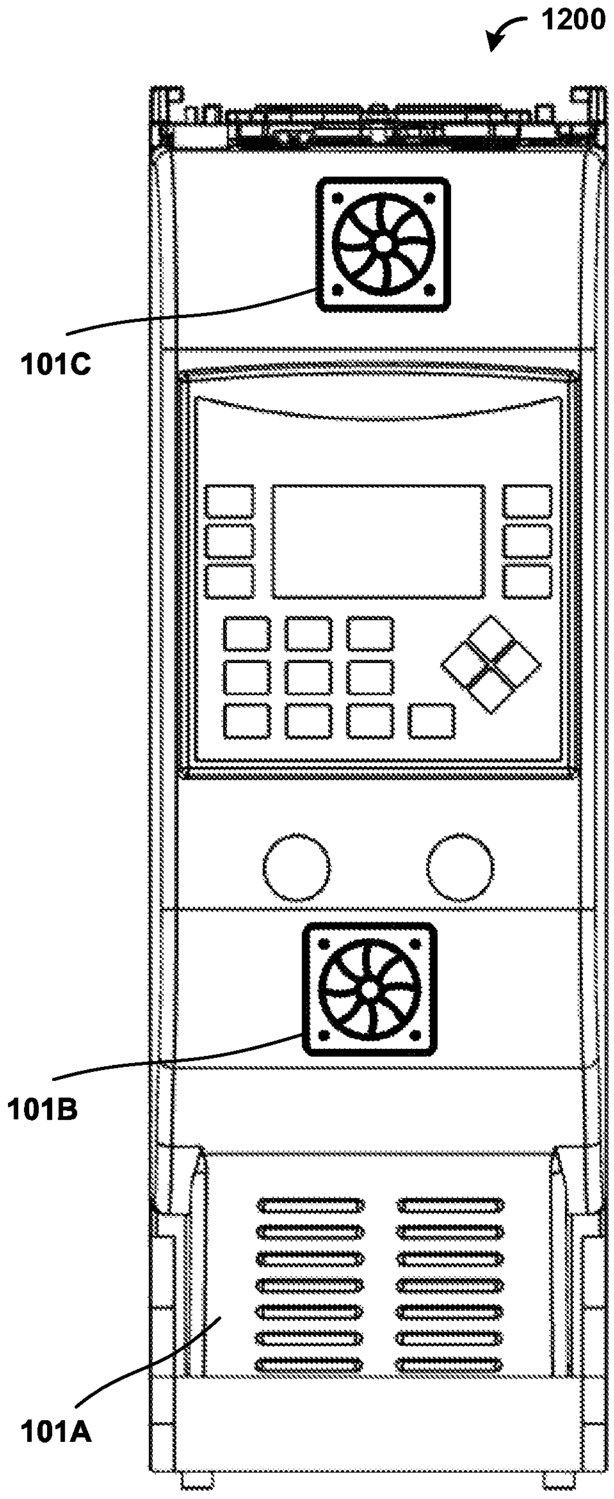

FIG. 12A shows a first example view of the dispensing device 1200 with the ionizing component 101A situated thereon. It is to be understood that the ionizing component 101A may be situated at another location(s) of the dispensing device 1200, and the dispensing device 1200 may comprise more than one ionizing component. For example, FIG. 12B shows an example front view of the dispensing device 1200 with ionizing components 101A, 101B, and 101C. The depiction of the dispensing device 1200 with the one or more ionizing components 101A-101C as shown in FIGS. 12A and 12B are meant to be exemplary only. The one or more ionizing components 101 may circulate ionized air throughout the interior of the dispensing device 1200. Further, while FIG. 12A shows the dispensing device 1200 with one ionizing component 101, and though FIG. 12B shows the dispensing device 1200 with three ionizing components 101A-101C, it is to be understood that the dispensing device 1200 may comprise less (e.g., as few as one) or more ionizing components than those shown in FIGS. 12A-12F. The ionizing component(s) 101 of the dispensing device 1200 may draw outside air into the dispensing device 1200 and/or circulate ionized air (e.g., inside and/or outside air—once ionized by the ionizing component(s) 101) throughout the interior of the dispensing device 1200, similar to the dispensing device 100 described herein.

Figure 12C:
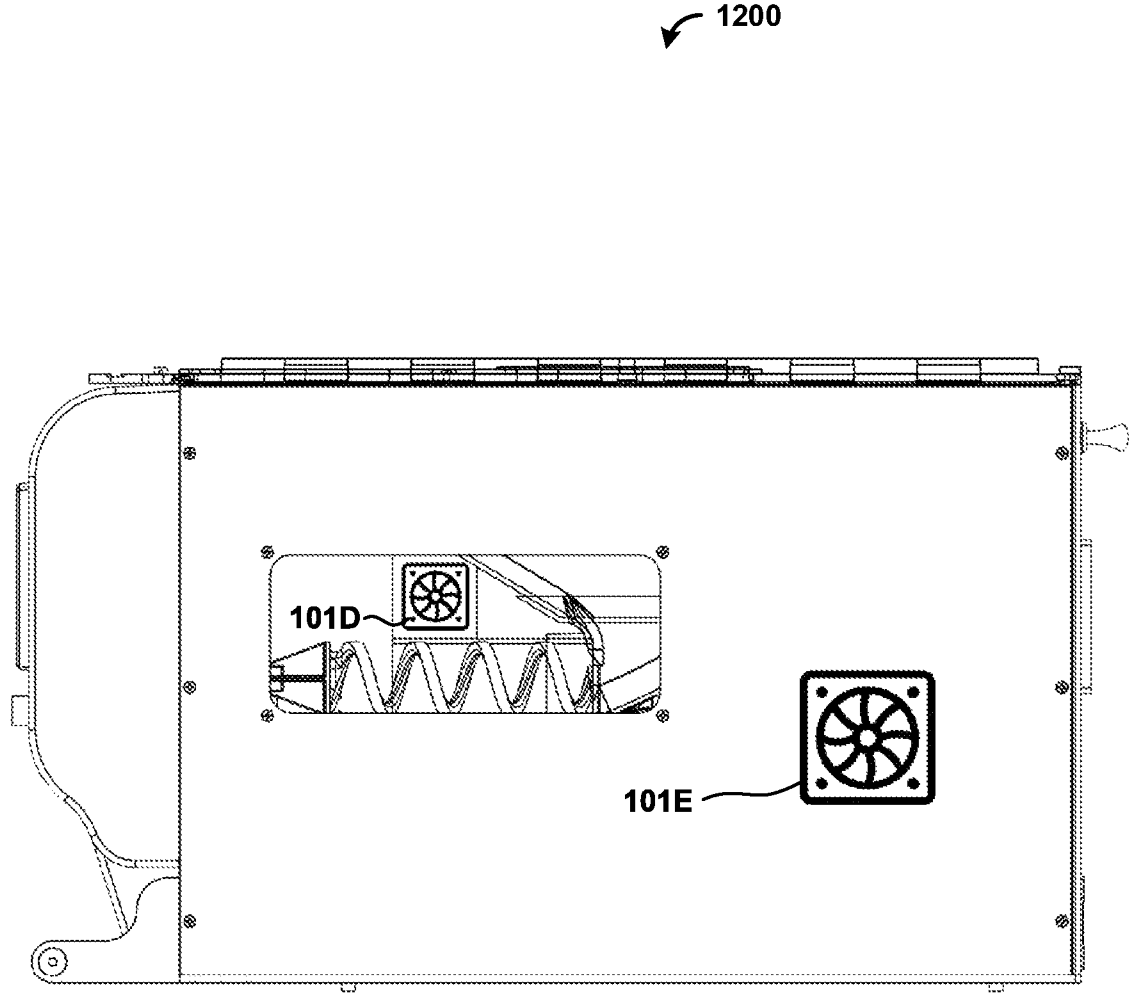
Figure 12D:
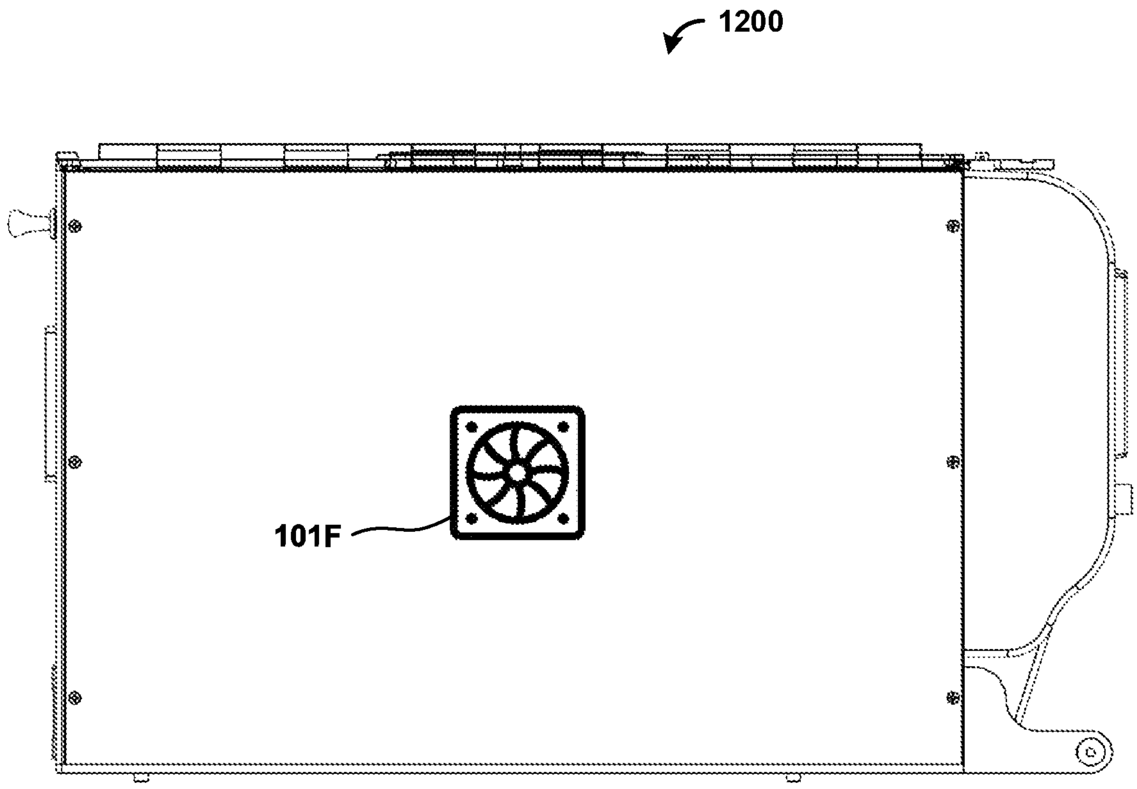
Figure 12E:
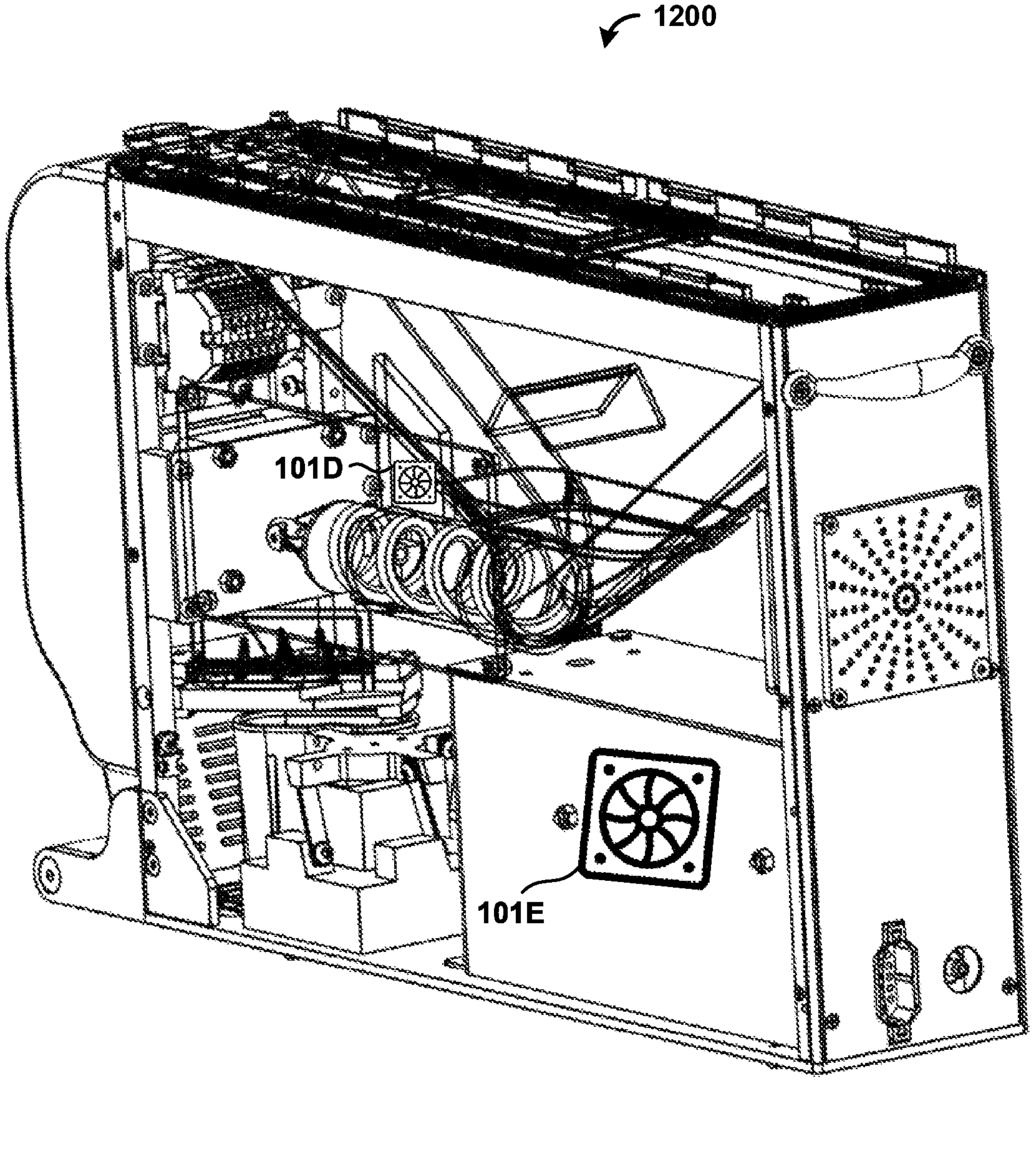
Figure 12F:
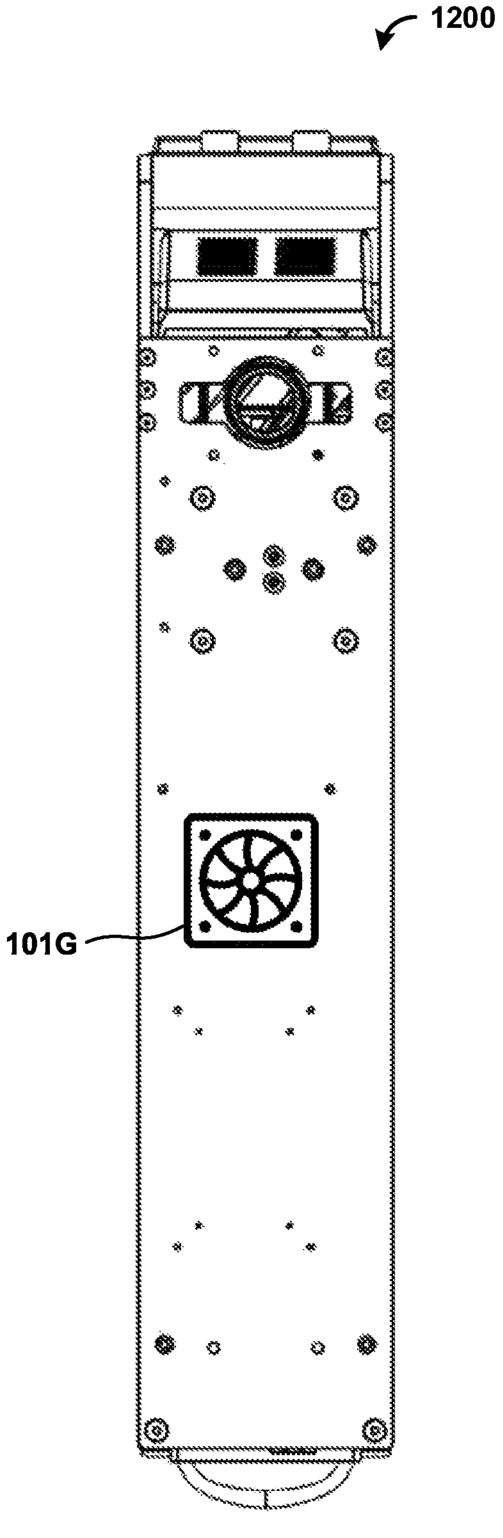

FIGS. 12C-12F show additional example views of the dispensing device 1200 with at least one ionizing component 101. FIG. 12C shows an example left-side view of the dispensing device 1200 with an ionizing component 101D situated within the dispensing device 1200 and an ionizing component 101E situated on a left side panel of the dispensing device 1200. It is to be understood that the ionizing components 101D,101E may be situated at another location (s) of the dispensing device 1200. The depiction of the dispensing device 1200 with the ionizing components 101D, 101E as shown in FIG. 12C is meant to be exemplary only. FIG. 12D shows an example right-side view of the dispensing device 1200 with an ionizing component 101F situated on a right side panel of the dispensing device 1200. It is to be understood that the ionizing component 101F may be situated at another location(s) of the dispensing device 1200. The depiction of the dispensing device 1200 with the ionizing component 101F as shown in FIG. 12D is meant to be exemplary only. FIG. 12E shows an example right-side view of the dispensing device 1200 (from the right side with a panel removed for illustration) with THE ionizing component 101D situated within the dispensing device 1200 and the ionizing component 101E situated on the left side panel of the dispensing device 1200. FIG. 12F shows an example bottom view of the dispensing device 1200 with an ionizing component 101G situated on a bottom panel of the dispensing device 1200. It is to be understood that the ionizing components 101G may be situated at another location(s) of the dispensing device 1200. The depiction of the dispensing device 1200 with the ionizing components 101G as shown in FIG. 12F is meant to be exemplary only. As noted above, it is to be understood that any of the ionizing components shown in FIGS. 12A-12F may be situated at another location (s) of the dispensing device 1200, and the dispensing device 1200 may comprise more than one ionizing component 101 that may or may not be shown in FIGS. 12A-12F.

Any of the one or more ionizing components 101 of the dispensing device 1200 may be configured to perform the maintenance procedure(s) described herein to discharge any electrostatic charge of any object(s) within the dispensing device 1200. The object(s) within the dispensing device 1200 may include, for example, any pills, tablets, capsules, etc., that may have built up an electrostatic charge as a result of moving within, along, adjacent, etc., any component(s) of the dispensing device 1200 (e.g., a tube(s), a hopper(s), a feeder(s), a plate(s), a bowl(s), etc.). The maintenance procedure(s) may comprise any of the one or more ionizing components 101 of the dispensing device 1200 circulating ionized air throughout the interior of the dispensing device 1200. The ionized air may neutralize the electrostatic charge of the objects within the dispensing device 1200, thereby allowing the objects to pass through, over, within, etc., the various components of the dispensing device 1200 more freely.

The dispensing device 1200 may comprise a control module (not shown), such as the control module 106, which may be configured to operate in a similar manner as the control module of the dispensing device 100. The control module of the dispensing device 1200 may be located anywhere within or affixed/fastened to the dispensing device 1200. The control module of the dispensing device 1200 may comprise a programmable logic controller, a computing device(s), etc. For example, the control module of the dispensing device 1200 may comprise a computing device 1301 as shown in FIG. 13 and described herein. The control module of the dispensing device 1200 may be operatively coupled to (e.g., in communication with) various elements and components of the dispensing device 1200. For example, the control module of the dispensing device 100 may be in communication with one or more optical sensors (not shown)—each of which may operate similarly to the optical sensors 142A and 142B and/or the sensor(s) 104 described herein. The control module of the dispensing device 1200 may be configured to cause any of the one or more ionizing components 101 of the dispensing device 1200 to perform the maintenance procedure(s) described herein to discharge any electrostatic charge of any object(s) within the dispensing device 1200.

The present methods and systems may be computer-implemented. FIG. 13 shows a block diagram depicting a system/environment 1300 comprising non-limiting examples of a computing device 1301 and a server 1302 connected through a network 1304. Either of the computing device 1301 or the server 1302 may be a computing device, a dispensing device, and/or a component thereof, such as the dispensing device 100 shown in FIG. 1 and/or the dispensing device 1200 shown in FIGS. 12A-12F. In an aspect, some or all steps of any described method may be performed on a computing device as described herein. The computing device 1301 and/or the server 1302 may comprise one or multiple computers configured to store sensor data 1329 (e.g., relating to object count, rate, etc., indicated by the optical sensor 142A and/or the optical sensor 142B), and/or the like. The computing device 1301 and/or the server 1302 may comprise one or multiple computers configured to store operating data 1324, which may store the schedule, the threshold quantity, etc., as described herein and relating to object count, rate, etc. Multiple servers 1302 may communicate with the computing device 1301 via the through the network 1304.

The computing device 1301 and the server 1302 may be a digital computer that, in terms of hardware architecture, generally includes a processor 1308, system memory 1310, input/output (I/O) interfaces 1312, and network interfaces 1314. These components (308, 1310, 1312, and 1314) are communicatively coupled via a local interface 1316. The local interface 1316 may be, for example, but not limited to, one or more buses or other wired or wireless connections, as is known in the art. The local interface 1316 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1308 may be a hardware device for executing software, particularly that stored in system memory 1310. The processor 1308 may be any custom made or commercially available processor, a central processing unit (CPU), an auxiliary processor among several processors associated with the computing device 1301 and the server 1302, a semiconductor-based microprocessor (in the form of a microchip or chip set), or generally any device for executing software instructions. When the computing device 1301 and/or the server 1302 is in operation, the processor 1308 may execute software stored within the system memory 1310, to communicate data to and from the system memory 1310, and to generally control operations of the computing device 1301 and the server 1302 pursuant to the software.

The I/O interfaces 1312 may be used to receive user input from, and/or for providing system output to, one or more devices or components. User input may be provided via, for example, a keyboard and/or a mouse. System output may be provided via a display device and a printer (not shown). I/O interfaces 1312 may include, for example, a serial port, a parallel port, a Small Computer System Interface (SCSI), an infrared (IR) interface, a radio frequency (RF) interface, and/or a universal serial bus (USB) interface.

The network interface 1314 may be used to transmit and receive from the computing device 1301 and/or the server 1302 on the network 1304. The network interface 1314 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 1314 may include address, control, and/or data connections to enable appropriate communications on the network 1304.

The system memory 1310 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 1310 may incorporate electronic, magnetic, optical, and/or other types of storage media. Note that the system memory 1310 may have a distributed architecture, where various components are situated remote from one another, but may be accessed by the processor 1308.

The software in system memory 1310 may include one or more software programs, each of which comprises an ordered listing of executable instructions for implementing logical functions. In the example of FIG. 13, the software in the system memory 1310 of the computing device 1301 may comprise the sensor data 1329, the operating data 1324, and a suitable operating system (O/S) 1318. In the example of FIG. 13, the software in the system memory 1310 of the server 1302 may comprise the sensor data 1329, the operating data 1324, and a suitable operating system (O/S) 1318. The operating system 1318 essentially controls the execution of other computer programs and provides scheduling, input-output control, file and data management, memory management, and communication control and related services.

For purposes of illustration, application programs and other executable program components such as the operating system 1318 are shown herein as discrete blocks, although it is recognized that such programs and components may reside at various times in different storage components of the computing device 1301 and/or the server 1302. An implementation of the system/environment 1300 may be stored on or transmitted across some form of computer readable media. Any of the disclosed methods may be performed by computer readable instructions embodied on computer readable media.

Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 14:
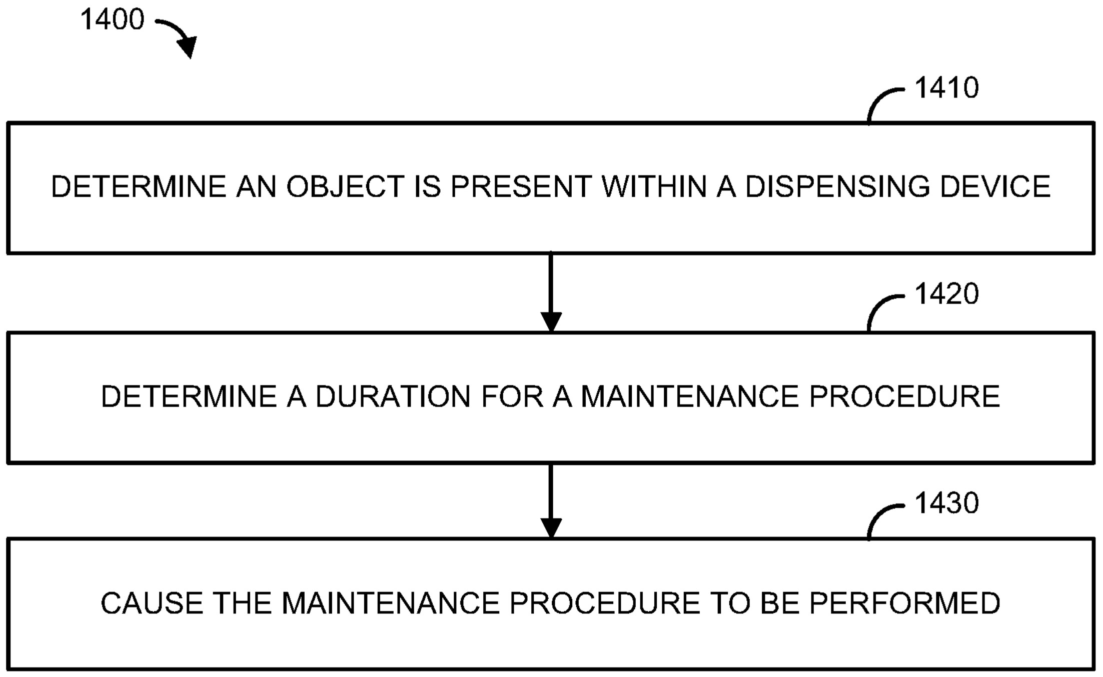
FIG. 14 shows a flowchart of an example method.

FIG. 14 shows a flowchart of a method 1400 for performing a maintenance procedure in accordance with the present description. The method 1400 may be implemented by any of the devices/entities described herein, such as the control module of the dispensing device 100 (e.g., the control module 106). At step 1410, the control module of the dispensing device 100 (or the dispensing device 1200) may determine than an object(s) is present within a dispensing portion of the dispensing device 100. For example, the object(s) may move between the optical sensor 142A and the optical sensor 142B, and a disruption to a light beam may be indicated to the control module by the optical sensor 142A and/or the optical sensor 142B. At step 1420, a duration for the maintenance procedure may be determined. For example, based on the indication received from the optical sensor 142A and/or the optical sensor 142B, the control module may determine the duration for the maintenance procedure. The duration may be determined based on a schedule. At step 1430, the control module may cause the maintenance procedure to be performed. For example, the control module may cause one or more of the ionizing components described herein to operate and circulate ionized air throughout the interior of the dispensing device 100 to prevent the object(s) from building up (and/or to neutralize) an electrostatic charge.

The control module may cause one or more of the ionizing components described herein to perform the maintenance procedure when the control module determines that an expected dispensing rate and/or dispensing quantity has not been achieved within a particular duration/interval. For example, the control module may cause one or more of the ionizing components described herein to perform the maintenance procedure in response to an indication received from the optical sensor 142A and/or the optical sensor 142B. The optical sensor 142A and/or the optical sensor 142B may indicate to the control module a count/quantity of objects (e.g., pills, tablets, capsules, etc.) that pass through a particular component(s) of the dispensing device 100, such as a count tube, hopper, bowl, etc., adjacent to the optical sensor 142A and/or the optical sensor 142B.

The control module may determine that the count of objects indicated by the optical sensor 142A and/or the optical sensor 142B falls below an expected quantity (e.g., threshold quantity) within a set interval/period of time. For example, the optical sensor 142A and/or the optical sensor 142B may be located at or near the dispensing neck 120 and/or the dispensing chute 118 of the dispensing device 100, and the optical sensor 142A and/or the optical sensor 142B may indicate to the control module that X objects have passed through the dispensing neck 120 and/or the dispensing chute 118 during a quantity of time Y. If the value, X, is less than the expected quantity (e.g., threshold quantity) for the quantity of time Y, then the control module may cause one or more of the ionizing components described herein to perform the maintenance procedure.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A dispensing device comprising:

an ionizing component; and a control module, wherein the control module is configured to:

determine an object is present within the dispensing device, wherein the object is associated with a threshold quantity;

determine, based on the threshold quantity, a duration for a maintenance procedure, and cause the ionizing component to perform the maintenance procedure for the determined duration.

2. The dispensing device of claim 1, wherein the ionizing component comprises a fan.

3. The dispensing device of claim 2, wherein the fan is configured to circulate ionized air within at least a portion of the dispensing device.

4. The dispensing device of claim 2, wherein the maintenance procedure comprises operating the fan for the determined duration.

5. The dispensing device of claim 1, wherein the control module is configured to determine the duration for the maintenance procedure based on a schedule.

6. The dispensing device of claim 1, wherein the control module is configured to determine the duration for the maintenance procedure based on a type of the object.

7. The dispensing device of claim 1, wherein the threshold quantity is associated with a period of time, and wherein the duration is based on the period of time.

8. The dispensing device of claim 1, further comprising at least one sensor configured to detect a presence of the object.

9. The dispensing device of claim 8, wherein the at least one sensor comprises an optical sensor configured to emit a light beam through which the object passes.

10. The dispensing device of claim 9, wherein the control module is configured to determine the object is present within the dispensing device based on an indication from the optical sensor that the object has passed through the light beam.

11. A method comprising:

determining, by a control module of a dispensing device, that an object is present within the dispensing device, wherein the object is associated with a threshold quantity;

determining, by the control module and based on the threshold quantity, a duration for a maintenance procedure; and causing, by the control module, an ionizing component of the dispensing device to perform the maintenance procedure for the determined duration.

12. The method of claim 11, wherein the ionizing component comprises a fan.

13. The method of claim 12, wherein the fan is configured to circulate ionized air within at least a portion of the dispensing device.

14. The method of claim 12, wherein the maintenance procedure comprises operating the fan for the determined duration.

15. The method of claim 11, wherein determining the duration for the maintenance procedure comprises determining, based on a schedule, the duration for the maintenance procedure.

16. The method of claim 11, wherein determining the duration for the maintenance procedure comprises determining, based on a type of the object, the duration for the maintenance procedure.

17. The method of claim 1, wherein the threshold quantity is associated with a period of time, and wherein the duration is based on the period of time.

18. The method of claim 11, wherein the dispensing device comprises at least one sensor configured to detect a presence of the object.

19. The method of claim 18, wherein the at least one sensor comprises an optical sensor configured to emit a light beam through which the object passes.

20. The method of claim 19, wherein the control module is configured to determine the object is present within the device based on an indication from the optical sensor that the object has passed through the light beam.

* * * * *